Sept. 17, 1957  D. G. FAUST  2,806,481
PILOT CONTROLLED PRESSURE REGULATOR
Filed April 8, 1953
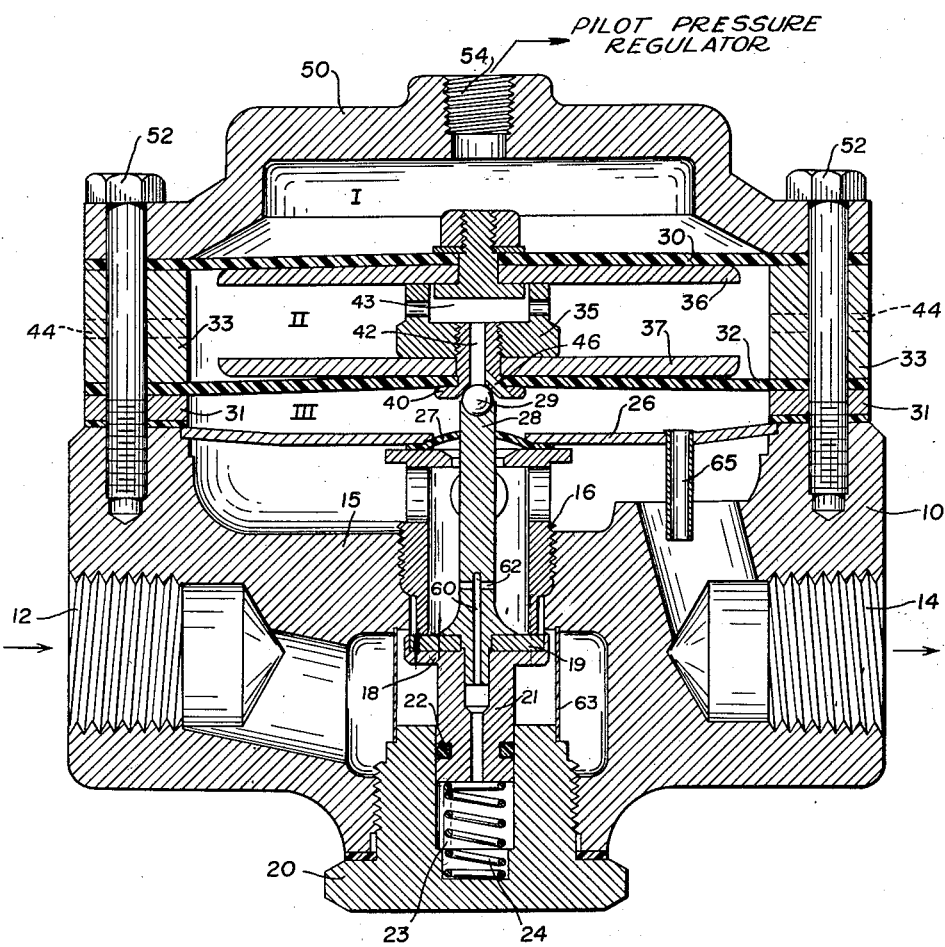
INVENTOR.
Delbert G. Faust
BY
ATTORNEY

2,806,481
PILOT CONTROLLED PRESSURE REGULATOR

Delbert G. Faust, Englewood, Colo., assignor to C. A. Norgren Co., Englewood, Colo., a corporation of Colorado Application April 8, 1953, Serial No. 347,520

3 Claims. (Cl. 137—116.5)

This invention relates to pressure regulating valves having a flexible diaphragm under controlled fluid pressure for activating the regulating valve mechanism.

A pressure regulating valve is generally a device for throttling and controlling primary, line or supply fluid, which is usually at pressures too high for utilization as is. In general, pressure regulating valves of the past have used a spring loaded valve for controlling delivered pressures from the valve. In other words, high pressure fluid from a supply source is throttled, by means of a spring loaded pressure regulating valve, to a useful pressure. To be effective the pressure regulating valve must deliver fluid at the desired pressure with changing amounts of fluid passing through the valve. The regulator should also supply fluid at the desired pressure regardless of the primary or supply pressure, so long as the supply pressure is above the desired regulated pressure. Within very narrow ranges of flow volumes spring loaded pressure regulating valves can supply fluid at the approximate desired pressure. A spring will not supply the same force at different lengths of distention, and since valve movement extends the spring to different lengths under different flow requirements, the pressure thus passing a spring loaded regulator varies at each flow rate. Furthermore, springs under compression are subject to various stresses, such as distortion of the coils, etc. which adds further to the variations in force from the spring temperature change, likewise, changes the force supplied by a spring at a given setting.

Included among the objects and advantages of the present invention is a fluid-pressure-controlled pressure regulating valve which delivers pressure controlled fluid over a wide range of flow requirements. The pressure regulator, further, supplies a pressure balanced valve which minimizes the effect of primary pressure fluctuations. Also, the pressure regulator has a relief valve therein, for relieving excessive pressure on the outlet side thereof. The regulator controls delivered fluid pressure without the use of heavy adjusting springs. The regulator supplies a simply constructed, rugged fluid pressure regulating valve which is controlled by a pilot regulator. These and other advantages may be ascertained from the following description and claims.

In general, the pressure regulating valve has a body with an inlet and an outlet. A passage joins the inlet and the outlet, and a valve in the passage controls the passage of fluid therethrough. A pressurized chamber with a flexible wall associated with the valve supplies operating force for the valve. A relief valve is associated with the valve to relieve excess pressure from the outlet side of the regulator. The regulator has a substantially balanced valve by means of a communicating passage between both sides of the valve and opening to the outlet pressure side.

In more specific detail the device of the present invention will be better understood by referring to the following description and accompanying drawing.

The single figure of the application is a cross-sectional elevation of a device according to the invention.

In the embodiment selected for illustration, the regulator has a generally round body 10 having an inlet 12 and an outlet 14, both of which are adapted for connection into a compressed fluid conduit. An internal wall 15 generally separates the inlet from the outlet, and a valve seat 16 is detachable connected to the wall 15. A valve 18 disposed in the passage as a resilient gasket 19 adapted to seat against the valve seat 16 for closing passage. A plug 20 is detachably connected to the body 10 and encloses an extension 21 on the valve 18. The extension 21 is reciprocally sealed to the plug by means of an O ring seal 22. A spring 24 normally urges the valve against the valve seat in operative position.

A baffle 26 secured to the body 10 substantially closes the passage through the body. A plunger 28 on the valve 18 is reciprocally sealed through the baffle plate, and is adapted to reciprocate therethrough to operate the valve 18. A small flexible diaphragm 27 encircling plunger 28 seals the plunger to the baffle.

A pair of flexible diaphragms sealed to the body supply operating force for moving the plunger 28 and hence the valve 18. One diaphragm 32 is spaced from the baffle 26 by means of a spacer 31, and the diaphragm 30 spaced away from the diaphragm by means of a separator 33. The diaphragms are interconnected, whereby movement with one diaphragm equally moves the other diaphragm. The diaphragms are spaced apart and interconnected at the center thereof by means of a spacing nut 35 connected through a backing plate 36 backing the upper flexible diaphragm 30 and a backing plate 37 backing the lower flexible diaphragm 32. The backing plates 36 and 37 prevent buckling or distension of the flexible diaphragms under fluid pressure. The plates evenly transmit pressure applied to the flexible diaphragm. A ball 29 secured in the plunger 28 rests against the valve seat 40 interconnected with diaphragm 32, and the ball substantially closes passage 42, which exhausts into lateral passage 43. The seat 40, the ball 29, and the passages 42, 43 form a pressure relief valve for excess pressure which may build up on the outlet side of the valve 18. Atmospheric vents 44 are supplied in the separator 33 for exhausting pressure which passes back into chamber No. II through the relief valve. A small bleed 46 which bypasses the ball 29 allows a continuous bleeding of a small amount of fluid from the chamber between the baffle plate and the flexible diaphragm 32. The continuous bleed prevents the valve from seating for any substantial length of time so as to prevent undue distortion by excessive seating pressure of the valve and distortion of the valve gasket 19 against the valve seat 16.

A bonnet 50 seated above flexible diaphragm 30 substantially completes the enclosure of the regulator valve. The bonnet is retained in place by means of bolts 52. A threaded entrance 54 passes through the bonnet and is adapted to be connected to a pilot regulator for supplying fluid under controlled pressure into the space No. I between the bonnet and the diaphragm 30.

The valve 18 is a substantially balanced valve, wherein pressures acting on both sides of the valve are substantially balanced. A passage 60 passing through the valve and interconnected with lateral passage 62 and the spring chamber 23, substantially equalizes the pressure in the spring chamber with the pressure on the outlet side of the valve. The characteristics of regulation may be changed by changing the dimensions of the diameter of the stem 21 in relation to the valve seat 16. The area of the stem bottom is substantially equal the area of the outlet within the periphery of the valve seat, so that the valve is substantially in balance. The balance valve feature is very desirable to counteract fluctuating supply line pressures.

The valve 18 is protected from foreign matter by means of a filter 63 surrounding the valve interconnected between the wall 15 and the plug 20. The filter may be any suitable material such as a small mesh screen, sintered metal filters, perforated cylinders, etc.

The tube 65 leading from the chamber No. III between the baffle plate 26 in the flexible diaphragm 32 extends into the outlet whereby fluid flowing past the tube creates a venturi action lowering somewhat the pressure in the control chamber III between the baffle plate and the diaphragm, and increasing the flow capacity of the valve by causing the valve to be open slightly more under the same pressure differentials.

In operation the regulating valve is connected to a fluid conduit by means of inlet 12 and outlet 14. A pilot regulator, a standard spring loaded regulating valve, is normally adequate to control the pressure regulator of the present invention. A relieving type regulator is preferable, especially a regulator which will give precise regulation under no flow characteristics, since the chamber No. I has no outlet and is, therefore, pressurized under no flow regulation. A pilot regulator is connected to the bonnet through the bonnet inlet 54 and the pressure in the bonnet is adjusted by means of the spring loaded pilot pressure regulator. As chamber No. I is pressurized by means of the spring loaded regulator the diaphragm 30 bulges downwardly and moving with it, diaphragm 32. The valve 18, by means of the plunger 28, is likewise moved down with the diaphragm so that the valve 18 is opened. As fluid flows out through the outlet, the venturi action on tube 65 lowers the pressure in chamber No. III further flexing the flexible diaphragm and opening valve 18 slightly further.

When the outlet pressure reaches the desired point the pressure in chamber No. III builds up so that the forces on both diaphragms are substantially balanced and the valve 18 closes due to the return to normal state of the flexible diaphragms. As the outlet or demand increases the valve 18 opens in response to the lowering of pressure in the outlet and subsequently in chamber No. III. Under static conditions, that is, where there is no flow through the outlet 14, the bleed 46 permits a small amount of fluid to pass through the passage 42, into passage 43, into chamber No. II, and out vent 44. This constant bleed continually lowers the pressure in chamber No. III causing the flexible diaphragms to open valve 18, and prevent the gasket 19 from seating and distorting onto the valve seat 16 and thereby ruin the operating characteristics of the valve.

Under some conditions when the outlet demand suddenly stops, the valve 18 does not close quickly enough, or a surge of back pressure, builds up pressure in chamber No. III so that the forces on diaphragm 32 are greater than forces on diaphragm 30, the diaphragms flex upwardly into chamber No. I opening the relief valve, and the excess pressure passes through passage 42 and subsequently into the atmosphere.

The operating characteristics may be readily changed by changing the effective area of the diaphragms 32 and 30. As illustrated, the diaphragm areas are about a one to one ratio, so that the pressure in chamber No. I is substantially the controlled pressure at outlet 14. The ratio may be changed to substantially any desired operating characteristics, such as having a high pressure controlling a low pressure, whereby fluctuation of the high pressure would diminish by about the ratio of areas.

The foregoing drawing and disclosure is for illustration and not for limitation of the elements of novelty therein disclosed whether taken singly and/or in combination.

I claim:

1. A pressure regulator comprising a body including a plurality of chambers, a passage through said body, said passage having an inlet and an outlet, a valve reciprocally disposed in said passage adapted to open and close the same, a control chamber adjacent said passage, a baffle segregating said control chamber from said passage, an intermediate chamber open to the atmosphere adjacent said control chamber, a first flexible diaphragm segregating said control chamber and said intermediate chamber, a pressure chamber under independent controlled fluid pressure adjacent said intermediate chamber, a second diaphragm segregating said intermediate chamber and said pressure chamber, connecting means joining said two flexible diaphragms, said connecting means including pressure relieving passage means from said control chamber to said intermediate chamber, an extension on said valve reciprocally sealed to and extending through said baffle, said extension normally seated against said first flexible diaphragm and substantially sealing said relieving passage, a small bleed bypass around said relieving means whereby fluid from said outlet side of said valve is constantly released, a stem on said valve extending oppositely from said extension, means reciprocally sealing said stem with said body and segregating a chamber under said stem, spring means in said chamber normally urging said valve in closed position, an orifice in said stem and valve interconnecting said stem chamber and the outlet side of said passage, a tube through said baffle extending into said outlet whereby outgoing fluid flowing past said tube produces a venturi effect for lowing the pressure in the control chamber, and an inlet to said pressure chamber adapted to admit fluid under controlled pressure into said pressure chamber for supplying operating force on said valve.

2. In a pressure regulating valve having an inlet and an outlet and a control valve therebetween, a first and second flexible diaphragm spaced apart and cooperatively interconnected, said first diaphragm being subjected to outlet pressure, means associated with said diaphragms for continuously bleeding to the atmosphere fluid from the outlet of said regulating valve, means extending from said control valve to said first diaphragm whereby movement of said diaphragm actuates said control valve, and means adapted to apply a predetermined fluid pressure to said second diaphragm for operating said valve.

3. In a pressure regulating valve having an inlet and an outlet and a control valve therebetween, a first and a second flexible diaphragm spaced apart and cooperatively interconnected, said first diaphragm being subjected to outlet pressure, a relief valve associated with said diaphragms adapted to relieve excess pressure from the outlet to an intermediate atmospheric chamber between said diaphragms, means associated with said relief valve for continuously bleeding to the atmosphere fluid from the outlet of said regulating valve, means extending from said control valve to said first diaphragm whereby movement of said diaphragm actuates said control valve and whereby said extending means is integral with said relief valve, and means adapted to apply a predetermined fluid pressure to said second diaphragm for operating said control valve.

References Cited in the file of this patent

UNITED STATES PATENTS

| | | |
|---|---|---|
| 951,172 | Biedenmeister | Mar. 8, 1910 |
| 1,178,802 | Hamlin | Apr. 11, 1916 |
| 1,595,809 | Nichols | Aug. 10, 1926 |
| 1,925,301 | Campbell | Sept. 5, 1933 |
| 1,950,121 | McKee | Mar. 6, 1934 |
| 1,956,977 | Shawn | May 1, 1934 |
| 2,150,460 | Riches | Mar. 14, 1939 |
| 2,239,116 | Ray | Apr. 23, 1941 |
| 2,261,364 | Grove | Nov. 4, 1941 |
| 2,270,304 | Jacobsson | Jan. 20, 1942 |
| 2,487,089 | Anthes | Nov. 8, 1949 |
| 2,487,650 | Grove | Nov. 8, 1949 |
| 2,587,375 | Paulsen | Feb. 26, 1952 |
| 2,599,577 | Norgren | June 10, 1952 |

FOREIGN PATENTS

| | | |
|---|---|---|
| 517,057 | Germany | Jan. 15, 1931 |